(12) United States Patent
Aida et al.

(10) Patent No.: US 6,441,334 B1
(45) Date of Patent: Aug. 27, 2002

(54) GAS SHIELDED ARC WELDING FLUX CORED WIRE

(75) Inventors: Isao Aida; Tetsuo Suga; Tsuyoshi Kurokawa; Fusaki Koshiishi; Hajime Uchiyama, all of Fujisawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/123,464

(22) Filed: Jul. 28, 1998

(30) Foreign Application Priority Data

Aug. 22, 1997 (JP) ............................................. 9-226502

(51) Int. Cl.$^7$ ............................................. B23K 35/38
(52) U.S. Cl. ........................ 219/74; 219/72; 219/146.1; 219/146.23
(58) Field of Search ........................ 219/74, 72, 146.1, 219/146.23, 146.24, 136, 137 WM; 148/22, 24

(56) References Cited

U.S. PATENT DOCUMENTS

| | | | |
|---|---|---|---|
| 3,947,655 A | * 3/1976 | Gonzalez et al. | 219/146 |
| 4,343,984 A | * 8/1982 | Smith et al. | 219/146.3 |
| 4,366,364 A | * 12/1982 | Arai et al. | 219/146.24 |
| 4,571,480 A | 2/1986 | Sakai et al. | |
| 5,580,475 A | 12/1996 | Sakai et al. | |

FOREIGN PATENT DOCUMENTS

| | | |
|---|---|---|
| EP | 0 231 570 | 8/1987 |
| FR | 2 270 982 | 12/1975 |
| JP | 2-055696 | 2/1990 |
| JP | 5-329684 | 12/1993 |
| JP | 6-155079 | 6/1994 |
| JP | 9-094665 | 4/1997 |
| JP | 9-094695 | 4/1997 |
| JP | 9-285891 | 11/1997 |

OTHER PUBLICATIONS

Patent Abstracts of Japan, vol. 14, No. 224 (M–0972), May 11, 1990, JP 2–055696, Feb. 26, 1990.

\* cited by examiner

*Primary Examiner*—M. Alexander Elve
(74) *Attorney, Agent, or Firm*—Oblon, Spivak, McClelland, Maier & Neustadt, P.C.

(57) ABSTRACT

Realized is a welding wire containing flux used for a gas shielded arc welding of a direct current/positive polarity mode, with use of which a quantity of sputter generated is small, a good weldability is realized and a weld metal with an excellent toughness is obtained in all the welding positions under application of a welding current in the range of a low current to a medium current, or in a definite manner in the range of 50 to 300 A. The flux contains 0.7 to 3 wt % Al, 0.1 to 1.0 wt % Mg and 1.2 to 5 wt % $BaF_2$, each content being a value in wt % to a total weight of the wire and the sum of a content of Al plus a content of Mg multiplied by 3 being in the range of 1.3 to 5 wt %, a filling ratio of the flux to the total weight of the wire is in the range of 5 to 30 wt %, a total Mn content in a steel sheath and the flux combined is in the range of 0.2 to 1.9 wt % and a total Si content in the steel sheath and the flux combined in the range of 0.001 to 0.9 wt %.

10 Claims, 1 Drawing Sheet

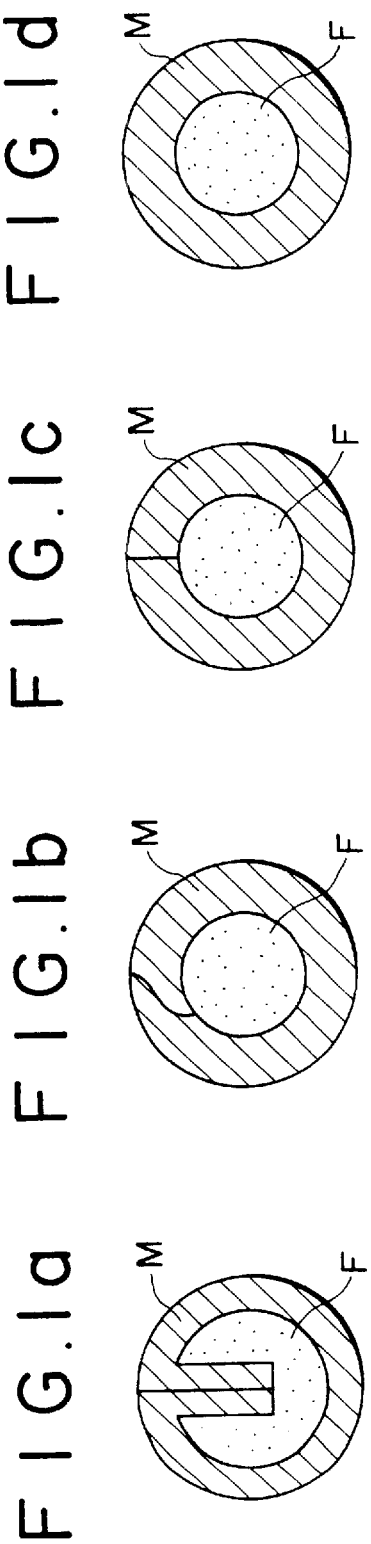

GAS SHIELDED ARC WELDING FLUX CORED WIRE

BACKGROUND OF THE INVENTION

1. Field of the Invention

The present invention relates to a welding wire containing flux used for a gas shielded arc welding of a direct current positive polarity mode with polarity arrangement that the welding wire is biased as a negative electrode and a mother material is biased as a positive electrode. More particularly, the present invention relates to a gas shielded arc welding flux cored wire, with use of which a quantity of sputter generated is small, a good weldability (bead forming inclination) is realized and a weld metal with an excellent toughness is obtained in all the welding positions such as not only a flat welding position but a vertical welding position and the like under application of a welding current in the range of a low current to a medium current, or in a definite manner in the range of 50 to 300 A.

2. Related Prior Art

The applicant has proposed a barium fluoride based flux cored wire, which is added with $BaF_2$ as a fluoride for the purpose to decrease a quantity of sputter by stabilizing arc (Publication of Unexamined Japanese Patent Application No. Hei. 2-55696). The barium fluoride based flux cored wire is used in a direct current positive polarity mode, where a direct current is used in arc welding and a wire is biased as a negative electrode (a mother material is a positive electrode). In the case of this direct current positive polarity mode, a melt drop at the tip end of the wire receives not only an impact force caused by a positive ion but a large reactive force caused by evaporation of $BaF_2$ and the like having a high vapor pressure, so that the melt drop at the tip end of the wire is transformed into smaller melt particles by the result of those forces, whereby a smooth transfer to the mother material is realized. Thus, stabilization of arc and reduction in a quantity of sputter is achieved.

The conventional gas shielded arc welding flux cored wire of a direct current positive polarity mode, which has been proposed, has a feature that the wire comprises $BaF_2$, Al, Mg, Fe, Mn and Si as indispensable components and a quantity of sputter generated is small under application of a low welding current in the range of 100 to 200 A.

However, with the conventional wire in use, there have been problems to be solved, which are 1) reduction in a quantity of sputter, 2) improvement on weldability (ability to realize good shaped bead formation) and 3) improvement on toughness of a weld metal, in all the positions such as a vertical position, a horizontal position, an overhead position, in which molten metal is subject to hanging-down by an influence of the gravitational force, under application of a welding current in the range of a low current to a medium current, or in a definite manner in the range of 50 to 300 A.

SUMMARY OF THE INVENTION

It is, accordingly, an object of the present invention to provide a gas shielded arc welding flux cored wire used in a direct current positive polarity mode, with use of which a quantity of sputter generated is small, a good weldability is realized and a weld metal with an excellent toughness is obtained in all the welding positions such as a flat welding position, an overhead welding position and the like under application of a welding current in the range of a low current to a medium current, or in a definite manner in the range of 50 to 300 A.

A first aspect of the present invention is directed to a gas shielded arc welding flux cored wire used in a direct current positive polarity mode, comprising: a steel sheath; and flux with which the steel sheath is filled, wherein the flux contains 0.7 to 3 wt % Al, 0.1 to 1.2 wt % Mg and 1.2 to 5 wt % $BaF_2$, each content being a value in wt % to a total weight of the wire and the sum of a content of Al plus a content of Mg multiplied by 3 being in the range of 1.3 to 5 wt %, a filling ratio of the flux to the total weight of the wire is in the range of 5 to 30 wt %, a total Mn content in the steel sheath and the flux combined is in the range of 0.2 to 1.9 wt % and a total Si content in the steel sheath and the flux combined in the range of 0.001 to 0.9 wt %.

A second aspect of the present invention is directed to a gas shielded arc flux cored wire used in a direct current positive polarity mode, comprising: a steel sheath; and flux with which the steel sheath is filled, wherein the flux contains 0.9 to 2.5 wt % Al, 0.1 to 0.8 wt % Mg and 1.2 to 4 wt % $BaF_2$, each content being a value in wt % to a total weight of the wire and the sum of a content of Al plus a content of Mg multiplied by 3 being in the range of 1.6 to 4 wt %, a filling ratio of the flux to the total weight of the wire is in the range of 7 to 20 wt %, a total Mn content in the steel sheath and the flux combined is in the range of 0.4 to 1.6 wt %, a total Si content in the steel sheath and the flux combined in the range of 0.001 to 0.6 wt %, a total C content in the steel sheath and the flux combined in the range of 0.005 to 0.08 wt %, wherein a ratio of the austenite forming elements to the ferrite forming elements $X=(4Ni+7Mn+20C)/(2Al+Si) \geq 0.7$, wherein the atomic symbols indicating respective contents of the corresponding elements, and a content of oxygen in a weld metal from the wire is 200 ppm or less.

A third aspect of the present invention is directed to a gas shielded arc flux cored wire used in a direct current positive polarity mode according to any one of the first and second aspects, wherein the flux further contains 0.1 to 3 wt % Ni, the weight % being to the total weight of the wire.

A fourth aspect of the present invention is directed to a gas shielded arc flux cored wire used in a direct current positive polarity mode according to any one of the first to third aspects, wherein the flux further contains 1.5 wt % or less oxides, the weight % being to the total weight of the wire.

With a flux cored wire used in gas shielded arc welding of a direct current positive polarity mode pertaining to the present invention having the above described constitution, a quantity of sputter generated is small, and not only is good weldability realized but a weld metal with an excellent toughness can also be obtained in all the welding positions such as a flat welding position, an overhead welding position and the like can also be attained under application of a welding current in the range of 50 to 300 A, that is in the range of a low current to a medium current.

BRIEF DESCRIPTION OF THE DRAWINGS

FIGS. 1(A) to 1(D) are sectional views, as models, showing examples of structures of flux cored wires according to the present invention.

DETAILED DESCRIPTION OF THE INVENTION

A flux cored wire pertaining to the present invention has a properly balanced composition of flux components such as Al, Mg, $BaF_2$ and the like and thereby a quantity of sputter can be kept small and good shaped bead formation can be realized for all the welding positions under application of a welding current in the range of a low current to a medium current, or in a definite manner in the range of 50 to 300 A. That is, strong deoxidizing agents such as Al and Mg decrease an oxygen content in a molten metal to increase a viscosity of the molten metal, which plays a role to realize a good shaped bead formation against an influence of the gravitational force. In addition, $BaF_2$, which is a fluoride, makes arc stable in a direct current positive polarity mode and thereby a quantity of sputter decreased, and at the same time, prevents an oxygen content in the molten metal from increasing and thereby serves as a slag forming agent to place bead formation in a good condition. When an oxygen content in a weld metal from the wire is 200 ppm or less, a viscosity of the molten metal is conspicuously increased, which makes weldability (bead forming inclination) for all the welding positions improved. When contents of the austenite forming elements of Ni, Mn and C and the ferrite forming elements of Al and Si are determined so that a ratio of the austenite forming elements of Ni, Mn and C to the ferrite forming elements of Al and Si in the wire assume a proper value, the weld metal is achieved with an excellent toughness. A flux cored wire according to the present invention is applied to welding for mild steel and high tensile strength steel and has an advantage that butt joint with a root gap in a groove can be welded to complete a single-sided welding while back beads are formed without use of a backing metal (which is used for the purpose to prevent dropping-off of a bead from occurring and forms back beads) in a different way from conventional in all the welding positions such as a flat welding, a vertical welding position and the like, since a molten metal has a high viscosity and is thus hard to be hung down as described above.

Described below will be the reason why a composition of a wire according to the present invention is limited to the above described composition of a wire, wherein the contents of components each are expressed in weight percentage to the total weight of the wire.

Al is an indispensable component to be included in a flux and a strong deoxidizing agent. Al increases a viscosity of a molten metal to improve shapes of beads in all the welding positions and has an effect to stabilize arc in a direct current positive polarity mode as well. However, if a content of Al is less than 0.7 wt %, arc is unstable and a quantity of sputter is large and on the other hand if a content of Al is over 3 wt %, a content of Al in a weld metal is in excess, which causes a texture of the weld metal to be coarser, so that a toughness of the weld metal is reduced. Therefore, it is preferred that a content of Al is set in the range of 0.7 to 3 wt % and more preferred that a content is set in the range of 0.9 to 2.5 wt % from a viewpoint of stabilization of arc and improvement on a toughness.

Mg is an indispensable component to be included in a flux and a strong deoxidizing agent. Mg increases a viscosity of a molten metal to improve shapes of beads in all the welding positions and has an effect to stabilize arc in a direct current positive polarity mode as well. However, if a content of Mg is less than 0.1 wt %, arc is unstable and a quantity of sputter is large and on the other hand if a content of Mg is over 1.2 wt %, centralization of arc is poor, whereby a quantity of sputter increases and shapes of beads are worsened forming as a protrusion. Therefore, a content of Mg is set in the range of 0.1 to 1.2 wt %, or more preferably in the range of 0.1 to 0.8 wt % from a viewpoint that shapes of beads are not worsened. While Mg plays a similar role to Al, a difference between both metals is that Mg is larger than Al in degree of increase in a viscosity of a molten metal, but if Mg is added in excess, a quantity of sputter is increased and shapes of beads are worsened as compared with the case of Al.

Al and Mg each are a strong deoxidizing agent and increase a viscosity of a molten metal to improve shapes of beads in all the welding positions and have an effect to stabilize arc in a direct current positive polarity mode as well. However, if a value of the sum of Al+3Mg is less that 1.3 wt %, wherein Al and Mg indicate contents of metals corresponding to the atomic symbols in wt %, the effect is not sufficient and a content of oxygen in a weld metal is in excess of 200 ppm, whereby a molten metal is liable to be hung down, whereas if the value is over 5 wt %, a viscosity of the molten metal is excessively high and beads are formed in the shape of a protrusion, which makes shapes of beads worsened. Therefore, a value of the sum of Al+3Mg is preferably set so as to be in the range of 1.3 to 5 wt %, or more preferably in the range of 1.6 to 4 wt % from a viewpoint of improvement on weldability and stabilization of arc.

$BaF_2$ is an indispensable component to be included in a flux and has an effect that arc is stabilized and a quantity of sputter is thereby decreased in a direct current positive polarity mode. However, if a content of $BaF_2$ is less than 1.2 wt %, such an effect is not exercised, whereas if a content of $BaF_2$ is larger than 5 wt %, a molten drop at the tip end of a wire is larger, which prevents smooth migration of the drop from occurring and to the contrary sputtering particles are is larger in size, so that a quantity of sputter is increased. Therefore, it is preferred that a content of $BaF_2$ is set in the range of 1.2 to 5 wt % and more preferred that a content of $BaF_2$ is set in the range of 1.2 to 4 wt % from a viewpoint of suppression of increase in size of sputtering particles.

Mn is an indispensable component and the reason why a content of Mn which is an austenite forming element is limited so that a total content of Mn in a steel sheath and a flux combined is in the range of 0.2 to 1.9 wt % that a toughness of a weld metal containing Al is secured. If a total content of Mn is less than 0.2 wt %, such an effect is not exercised and on the other hand if the total amount of Mn is larger than 1.9 wt %, a strength of a weld metal is excessively strong, which deteriorates a toughness to the contrary. Therefore, the total content of Mn is preferably set in the range of 0.2 to 1.9 wt %, or more preferably in the range of 0.4 to 1.6 wt % from a view point of security of a toughness.

Si is an indispensable component and the reason why a content of Si is limited so that a total content of Si in a steel sheath and a flux combined is in the range of 0.001 to 0.9 wt % that compatibility between a mother material and a weld metal is improved. If the total content of Si is less than 0.001 wt %, such an effect is not exercised. On the other hand if the total content of Si is larger than 0.9 wt %, a toughness of the weld metal is reduced. Therefore, The total content of Si is preferably set in the range of 0.001 to 0.9 wt %, or more preferably in the range of 0.001 to 0.6 wt % from a viewpoint of security of a toughness.

C is an austenite forming element and the reason why a total C content in the steel sheath and the flux combined is set in the range of 0.005 to 0.08 wt % that a toughness of a weld metal containing Al is secured. If the total content of C is less than 0.005 wt %, such an effect is not exercised and on the other hand if the total content of C is larger than 0.08 wt %, a strength of the weld metal is excessively strong which decreases a toughness to the contrary. Therefore, the total content of C is preferably in the range of 0.005 to 0.08 wt %, or more preferably in the range of 0.005 to 0.06 wt % from a viewpoint of security of a toughness.

It is preferable that a flux filling ratio to the total weight of a wire is set in the range of 5 to 30 wt %. That is, if a flux filling ratio is less than 5 wt %, a content of each component of the flux is insufficient and thereby a satisfactory effect cannot be obtained and on the other hand, if a flux filling ratio is lager than 30 wt %, a steel sheath has to be small in thickness, which causes an excessively high current density to flow through the wire, and which in turn causes arc to be unstable, so that a quantity of sputter is increased. Therefore, a flux filing ratio is preferably in the range of 5 to 30 wt %, or more preferably in the range of 7 to 20 wt % from a viewpoint of exercise of effectiveness of each flux component and arc stabilization.

According to present invention, an oxygen content in a weld metal from a wire is preferably in the range of 200 ppm or less. There is established a strong relation between a viscosity of a molten metal and an oxygen content in the metal and the lower an oxygen content is, the higher a viscosity of the molten metal, whereby if an oxygen content in the weld metal from the wire is less than 200 ppm, weldability (bead forming inclination) for all the welding positions is improved. A relation between an oxygen content in the weld metal and flux components cannot be clearly defined, since there is a trend that an oxygen content is decreased in proportion to a quantity of a strong deoxidizing agent such as Al, Mg or the like and in addition there are, as other factors to determine an oxygen content, a balance between the deoxidizing agent and a fluoride, a balance between the deoxidizing agent and oxides, a basicity of a slag and the like. In the present invention, it is conceived that there is the strongest correlation between a value of Al+3Mg and an oxygen content of the weld metal. Needless to say that as strong deoxidizing agents other than Al and Mg, Ca, Ti and the like can be incorporated into the flux or/and the steel sheath.

According to the present invention, Ni and oxides can be added as additional components if necessary. While Ni which is an austenite forming element is comparatively expensive, the element is effective for securing a toughness of a weld metal containing Al. However, if a content of Ni is less than 0.1 wt %, such an effect is not exercised and on the other hand if a content of Ni is more than 3 wt %, a strength of the weld metal is excessively strong and a toughness is decreased to the contrary. Therefore, it is preferred that a content of Ni is set in the range of 0.1 to 3 wt %. The oxides are components to be effective as a slag forming agent which works for improvement on shapes of beads or the like. However, if a content of an oxide is more than 1.5 wt %, a quantity of sputter is drastically increased. Therefore, a content of an oxide is preferably set to be 1.5 wt % or less. Among the oxides, neutral oxides such as an iron oxide and a Mn oxide, and basic oxides such as a Mg oxide and an Al oxide are oxides which have a comparatively small effect on the degree of increasing sputter. Zr is a metal which can be added from a standpoint of especially all the welding positions and if a content of Zr is less than 0.001 wt %, such an effect is small and on the other hand if a content of Zr is more than 1 wt %, a toughness of the weld metal is deteriorated.

The reason why a ratio of the austenite forming elements to the ferrite forming elements $X=(4Ni+7Mn+20C)/(2Al+Si) \geq 0.7$ is that when the austenite forming elements Ni, Mn and C are added at $X=0.7$ or more in relation to the ferrite forming elements Al and Si, a weld metal with an excellent toughness can be obtained. A value X is preferably set to be 1.2 or more.

As an feature of the present invention, it is possible that 0.2 wt % Ti or/and 0.001 to 0.02 wt % B can be included in a flux or/and a steel sheath in order to secure a toughness in low temperature.

There is no special limitation to a sectional structure; a variety of structures exemplified in FIGS. 1(A) to 1(D) can be employed. In the case of the seamless structure of FIG. 1(D), Cu plating may be applied on the surface of a wire. As a shield gas, either of carbon dioxide, and a mixture of carbon dioxide and argon gas can be used.

EXAMPLES

Flux cored wires shown in Tables 3 and 4 were produced with use of steel sheaths (corresponding to JIS G 3141 SPCC-SD) shown in Table 2. The wires have the same parameters of a wire diameter of 1.6 mm and a flux filling ratio of 10%, and a sectional structure of each wire is shown in FIG. 1(B).

Multi-layer/multi-pass welding for a V-groove butt joint in a vertical welding position selected as a representative of all the welding positions was executed with use of the flux cored wires in welding conditions shown in Table 1 and results were evaluated on easiness of bead formation (weldability), a quantity of sputter and a toughness of a weld metal (based on JIS Z 3313). In Example No. 23 according to the present invention, as a shield gas, a mixture of 20% $Co_2$ and 80% Ar instead of $CO_2$ gas was used.

The results of a welding test were shown in Table 5, wherein the evaluations were indicated by the following marks, in which in the column for all the welding positions (overhead welding position as representative): ⊚ means that a shape of a bead is very flat (being flattened with ease), ○ means that a shape of a bead is almost flat, Δ means that a shape of a bead is of a somewhat protruding nature and × means that no welding can be performed or a shape of a bead is of a sharp protruding nature, in the column of sputter: ⊚ means that a quantity of sputter is very small, ○ means that a quantity of sputter is small and the sputter includes small particles of a diameter of 0.5 mm or less, Δ means that a quantity of sputter is rather small but there are frequent chances where the sputter includes medium particles of a diameter in the range of 0.5 to 1.0 mm in diameter and × means that sputter of large particles of 1.0 mm or more in diameter occurs in a great probability and in the toughness column (weld metal): ⊚ means that an adsorbed energy in a 0° C. Charpy test is 120 J or more, ○ means that an adsorbed energy in a 0° C. Charpy test is 70 J or more, Δ means that an adsorbed energy in a 0° C. Charpy test is 40 J or more and × means that an adsorbed energy in a 0° C. Charpy test is less than 40 J.

TABLE 1 steel plate for the test: JIS G 3106 SM490B, thickness 20 mm
shape of a joint: V-groove butt joint, groove angle of 45 degrees, root gap of 5 mm with a backing plate
wire diameter: 1.6 mm
flux filling ratio: 10%
shield gas: CO2, a flow rate of 20 l/min
welding position: vertical position
welding current: 200 A
welding voltage: 20 V
welding speed: 15 cm/min
wire extension: 20 mm
welding polarity: direct current positive polarity

TABLE 2

| sheath | wt % | | | | | |
| --- | --- | --- | --- | --- | --- | --- |
| | C | Si | Mn | P | S | Ti |
| i | 0.04 | 0.01 | 0.20 | 0.015 | 0.008 | 0.002 |
| ii | 0.005 | 0.001 | 0.35 | 0.012 | 0.005 | 0.05 |

TABLE 3

| Kinds of data | No. | flux component wt % ※1 | | | | | | | | Al + 3 Mg wt % | sheath | T.Mn wt % | T.Si wt % | T.C wt % | X value | oxygen content in weld metal (ppm) |
|---|---|---|---|---|---|---|---|---|---|---|---|---|---|---|---|---|
| | | Al | Mg | BaF$_2$ | Mn | Si | C | Ni | Others | | | | | | | |
| Comparative Examples | 1 | 0.6 | 0.6 | 2.2 | 0.5 | 0.2 | 0.003 | 0.003 | — | 2.4 | i | 0.68 | 0.21 | 0.04 | 3.95 | 120 |
| | 2 | 3.3 | 0.5 | 2.3 | 0.5 | 0.2 | 0.003 | 0.003 | — | 4.8 | i | 0.68 | 0.21 | 0.04 | 0.82 | 60 |
| | 3 | 1.9 | 0.05 | 1.3 | 0.2 | 0.01 | 0.01 | 0.002 | — | 2.05 | i | 0.38 | 0.02 | 0.05 | 0.96 | 180 |
| | 4 | 0.7 | 0.1 | 2.1 | 0.5 | 0.2 | 0.003 | 0.002 | — | 1 | i | 0.68 | 0.21 | 0.04 | 3.46 | 250 |
| | 5 | 2.2 | 1.5 | 3.9 | 0.5 | 0.35 | 0.002 | 0.003 | — | 6.7 | i | 0.68 | 0.36 | 0.04 | 1.17 | 60 |
| | 6 | 1 | 1.1 | 0.9 | 0.8 | 0.1 | 0.005 | 0.003 | — | 4.3 | i | 0.98 | 0.11 | 0.04 | 3.64 | 80 |
| | 7 | 2.5 | 0.8 | 5.3 | 0.5 | 0.3 | 0.005 | 0.003 | — | 4.9 | i | 0.68 | 0.31 | 0.04 | 1.05 | 80 |
| | 8 | 1.1 | 0.5 | 2.5 | 0.01 | 0.5 | 0.01 | 0.003 | — | 2.6 | i | 0.19 | 0.51 | 0.05 | 0.86 | 150 |
| | 9 | 1.5 | 0.9 | 1.5 | 2.1 | 0.3 | 0.01 | 0.002 | — | 4.2 | i | 2.28 | 0.31 | 0.05 | 5.13 | 100 |
| | 10 | 1.3 | 1.1 | 1.3 | 0.5 | — | 0.03 | 0.003 | — | 4.6 | ii | 0.82 | 0.0009 | 0.03 | 2.44 | 80 |
| | 11 | 2.9 | 0.2 | 4.5 | 0.6 | 1.1 | 0.02 | 0.005 | — | 3.5 | i | 0.78 | 1.11 | 0.06 | 0.97 | 100 |
| | 12 | 2.8 | 0.8 | 2.5 | 0.2 | 0.8 | 0.01 | 0.005 | — | 5.2 | i | 0.38 | 0.81 | 0.05 | 0.57 | 50 |

※1 the rest is iron powder and unavoidable impurities.

TABLE 4

| Kinds of data | No. | flux component wt % ※1 | | | | | | | | Al + 3 Mg wt % | sheath | T.Mn wt % | T.Si wt % | T.C wt % | X value | oxygen content in weld metal (ppm) |
|---|---|---|---|---|---|---|---|---|---|---|---|---|---|---|---|---|
| | | Al | Mg | BaF$_2$ | Mn | Si | C | Ni | Others | | | | | | | |
| Examples (of the present Invention) | 13 | 2.1 | 0.5 | 2.2 | 0.5 | 0.2 | 0.002 | 0.003 | — | 3.6 | i | 0.68 | 0.21 | 0.04 | 1.26 | 80 |
| | 14 | 2.1 | 0.8 | 2.9 | 1.3 | 0.5 | 0.001 | 0.003 | — | 4.5 | ii | 1.62 | 0.50 | 0.0037 | 2.43 | 100 |
| | 15 | 1.3 | 0.5 | 4.5 | 0.5 | 0.5 | 0.06 | 0.003 | — | 2.8 | i | 0.68 | 0.51 | 0.10 | 2.18 | 120 |
| | 16 | 2.4 | 0.7 | 3.5 | 0.6 | 0.3 | 0.01 | 0.5 | — | 4.5 | i | 0.78 | 0.31 | 0.05 | 1.66 | 80 |
| | 17 | 2.3 | 0.2 | 1.3 | 0.5 | 0.5 | 0.02 | 2.5 | — | 2.9 | i | 0.68 | 0.51 | 0.06 | 3.12 | 120 |
| | 18 | 2.4 | 0.7 | 4.8 | 0.6 | 0.4 | 0.02 | 1.1 | ※2 | 4.5 | ii | 0.92 | 0.40 | 0.02 | 2.16 | 100 |
| | 19 | 2.2 | 0.6 | 3.2 | 0.8 | 0.3 | 0.05 | 0.3 | — | 4 | i | 0.98 | 0.31 | 0.09 | 2.09 | 100 |
| | 20 | 2.3 | 0.6 | 2.1 | 0.7 | 0.3 | 0.05 | 3.3 | — | 4.1 | i | 0.88 | 0.31 | 0.09 | 4.31 | 100 |
| | 21 | 2.5 | 0.6 | 2.2 | 0.5 | 0.2 | 0.05 | 0.003 | ※3 | 4.3 | i | 0.68 | 0.21 | 0.09 | 1.26 | 80 |
| | 22 | 1.5 | 0.6 | 1.8 | 0.7 | 0.2 | 0.05 | 0.002 | ※4 | 3.6 | i | 0.88 | 0.21 | 0.09 | 2.48 | 120 |
| | 23 | 1.5 | 0.5 | 1.5 | 0.5 | 0.2 | 0.002 | 0.003 | — | 3 | i | 0.68 | 0.21 | 0.04 | 1.74 | 50 |
| | 24 | 2.1 | 0.5 | 2.2 | 0.5 | 0.2 | 0.002 | 0.003 | ※5 | 3.6 | i | 0.68 | 0.21 | 0.04 | 1.26 | 60 |

※1 the rest is iron powder and unavoidable impurities.
※2 T.Ti: 0.045 wt % B: 0.005 wt %
※3 MgO: 1.1 wt %
※4 MgO: 1.8 wt %
※5 Zr: 0.1 wt %

TABLE 5

| evaluation items | No. | weldability in all the welding positions | sputter | toughness | note |
|---|---|---|---|---|---|
| comparative examples | 1 | Δ | x | ○ | |
| | 2 | ○ | ⊙ | x | |
| | 3 | Δ | x | Δ | |
| | 4 | x | x | ○ | |
| | 5 | x | x | Δ | |
| | 6 | ○ | x | ○ | |
| | 7 | ○ | x | ○ | |
| | 8 | ○ | ○ | x | |
| | 9 | ○ | ○ | x | |
| | 10 | ○ | Δ | ○ | poor compatibility of beads |
| | 11 | ○ | Δ | x | |
| | 12 | Δ | Δ | x | |
| examples (of the present invention) | 13 | ○ | ⊙ | ○ | |
| | 14 | ○ | ○ | Δ | |
| | 15 | ○ | Δ | Δ | |
| | 16 | ○ | ⊙ | ⊙ | |
| | 17 | ○ | ○ | ⊙ | |
| | 18 | ○ | ○ | ⊙ | |
| | 19 | ○ | ○ | ○ | |
| | 20 | ○ | ⊙ | Δ | |
| | 21 | ○ | ○ | ○ | |
| | 22 | Δ | Δ | ○ | |
| | 23 | ○ | ⊙ | ○ | |
| | 24 | ⊙ | ⊙ | ○ | gas: Ar + 20% CO$_2$ |

As can be seen from the test results, there were the following problems in the comparative examples Nos. 1 to 12 because the comparative examples lacked at least one of the indispensable features of the present invention. In No. 1, a quantity of sputter was large because a content of Al was less than the lower limit and thereby arc was not stable and in No. 2, a toughness of a weld metal was deteriorated because a content of Al was more than the upper limit and was in excess to the contrary. In No. 3, a quantity of sputter was large because a content of Mg was less than the lower limit and thereby arc was unstable. In No. 4, a bead was inclined to hang down and the shape of the bead was bad, and arc was unstable and thereby a quantity of sputter was large because a value of Al+3Mg was less than the lower limit. In No. 4, an oxygen content in the weld metal was over 200 ppm of the defined upper limit. In No. 5, a shape of a bead is of a sharp protruding nature and bad, and a quantity of sputter was large because a content of Al and a value of Al+3Mg were larger than the respective upper limits.

In No. 6, arc was unstable and thereby a quantity of sputter is large because a content of $BaF_2$ is less than the lower limit and in No. 7, sputter of large diameter particles occurred in a great probability because a content of $BaF_2$ is larger than the upper limit to the contrary. In NO. 8, a total content of Mn was less than the lower limit and in No. 9, a content of a total content of Mn was larger than the upper limit, and in both comparative examples, a toughness of the weld metal was poor. In No. 10, a shape of a bead was good, but compatibility between a bead and mother material was bad because a total content of Si is lower than the lower limit. On the other hand, in No. 11, a toughness of the weld metal was decreased because a total content of Si was larger than the upper limit. In NO. 12, a shape of a bead was of a somewhat protruding nature and a toughness of the weld metal was poor because a value of Al+3Mg was larger than the upper limit and a total content of Mn was less than the recommended value (X=0.57<0.7).

In contrast to the above described results, as seen from the Table 5, in any of examples of the present invention (Nos. 13 to 23), a quantity of sputter was small and beads of a good shape and a weld metal excellent in toughness were achieved in a vertical welding position, which is a representative of all the welding positions. It was naturally confirmed that a good result was obtained in a vertically downward welding position as well.

As has been described above, according to the present invention, provided is a welding wire containing flux used for a gas shielded arc welding of a direct current positive polarity mode, with use of which a quantity of sputter generated is small, a good weldability is realized and a weld metal with an excellent toughness is obtained in all the welding positions such as not only a flat welding position but a vertical welding position and the like under application of a welding current in the range of a low current to a medium current, or in a definite manner in the range of 50 to 300 A.

What is claimed is:

1. A gas shielded arc welding flux cored wire used in a direct current positive polarity mode, the flux cored wire comprising: a steel sheath; and flux encased in the steel sheath, wherein the flux contains 0.7 to 3 wt % Al, 0.1 to 1.2 wt % Mg and 1.2 to 5 wt % $BaF_2$, each wt % being with respect to a total weight of the wire;

a sum of an Al content in the flux and three times a Mg content in the flux is in a range of 1.3 to 5 wt %;

a filling ratio of the flux to the total weight of the wire is in a range of 5 to 30 wt %;

a total Mn content in the steel sheath and the flux combined is in a range of 0.2 to 1.9 wt %; and a total content of Si, in a form other than $SiO_2$, in the steel sheath and the flux combined is in a range of 0.001 to 0.9 wt %.

2. A gas shielded arc flux cored wire used in a direct current positive polarity mode, the flux cored wire comprising: a steel sheath; and flux encased in the steel sheath, wherein the flux contains 0.9 to 2.5 wt % Al, 0.1 to 0.8 wt % Mg and 1.2 to 4 wt % $BaF_2$, each wt % being with respect to a total weight of the wire;

a sum of an Al content in the flux and three times a Mg content in the flux is in a range of 1.6 to 4 wt %;

a filling ratio of the flux to the total weight of the wire is in a range of 7 to 20 wt %;

a total Mn content in the steel sheath and the flux combined is in a range of 0.4 to 1.6 wt %;

a total content of Si, in a form other than $SiO_2$, in the steel sheath and the flux combined is in a range of 0.001 to 0.6 wt %;

a total C content in the steel sheath and the flux combined is in a range of 0.005 to 0.08 wt %; and X=(4Ni+7Mn+20C)/(2Al+Si)≧0.7, where the atomic symbols indicate respective contents of the corresponding elements in the steel sheath and the flux combined in wt % with respect to the total weight of the wire.

3. The flux cored wire according to claim 1 or 2, wherein Ni is present in the flux at a content of 0.1 to 3 wt % Ni with respect to the total weight of the wire.

4. The flux cored wire according to claim 1 or 2, wherein the flux further contains 1.5 wt % or less oxides with respect to the total weight of the wire; and the oxides include an oxide of at least one of Fe, Mn, Mg and Al.

5. The flux cored wire according to claim 1 or 2, wherein Zr is present in the flux at a content of 0.001 to 1 wt % Zr with respect to the total weight of the wire.

6. The flux cored wire according to claim 3, wherein the flux further contains 1.5 wt % or less oxides with respect to the total weight of the wire; and the oxides include an oxide of at least one of Fe, Mn, Mg and Al.

7. The flux cored wire according to claim 3, wherein Zr is present in the flux at a content of 0.001 to 1 wt % Zr with respect to the total weight of the wire.

8. The flux cored wire according to claim 3, wherein the flux further contains 1.5 wt % or less oxides with respect to the total weight of the wire;

the oxides include an oxide of at least one of Fe, Mn, Mg and Al; and

Zr is present in the flux at a content of 0.001 to 1 wt % Zr with respect to the total weight of the wire.

9. A gas shielded arc welding flux cored wire used in a direct current positive polarity mode, the flux cored wire comprising: a steel sheath; and flux encased in the steel sheath, wherein the flux contains 0.7 to 3 wt % Al, 0.1 to 1.2 wt % Mg and 1.2 to 5 wt % $BaF_2$, each wt % being with respect to a total weight of the wire;

a sum of an Al content in the flux and three times a Mg content in the flux is in a range of 1.3 to 5 wt %;

a filling ratio of the flux to the total weight of the wire is in a range of 5 to 30 wt %;

a total Mn content in the steel sheath and the flux combined is in a range of 0.2 to 1.9 wt %;

a total content of Si, in a form other than $SiO_2$, in the steel sheath and the flux combined is in a range of 0.001 to 0.9 wt %;

B is present in the flux; and a total B content in the steel sheath and the flux combined is in a range of 0.001 to 0.02 wt % with respect to the total weight of the wire.

10. The flux cored wire according to claim 1, further comprising Cu on an outer surface of the wire.

* * * * *